April 28, 1936. R. C. CROSS 2,038,830
ROTARY VALVE FOR INTERNAL COMBUSTION ENGINES AND THE LIKE
Filed March 28, 1935 4 Sheets-Sheet 1

INVENTOR
ROLAND C. CROSS,
BY *Carroll Bailey*
ATTORNEY

April 28, 1936.   R. C. CROSS   2,038,830
ROTARY VALVE FOR INTERNAL COMBUSTION ENGINES AND THE LIKE
Filed March 28, 1935    4 Sheets-Sheet 2

INVENTOR
ROLAND C. CROSS,
BY
ATTORNEY

April 28, 1936.   R. C. CROSS   2,038,830
ROTARY VALVE FOR INTERNAL COMBUSTION ENGINES AND THE LIKE
Filed March 28, 1935   4 Sheets-Sheet 3

INVENTOR
ROLAND C. CROSS,
BY
ATTORNEY

April 28, 1936. R. C. CROSS 2,038,830
ROTARY VALVE FOR INTERNAL COMBUSTION ENGINES AND THE LIKE
Filed March 28, 1935 4 Sheets-Sheet 4
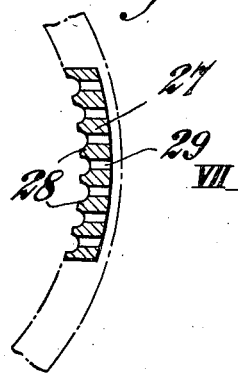
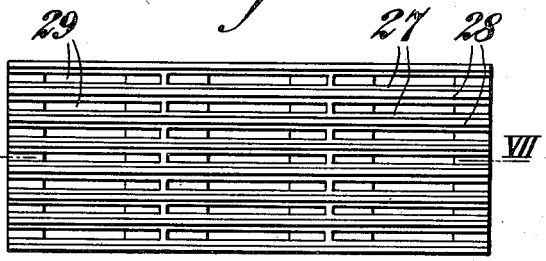
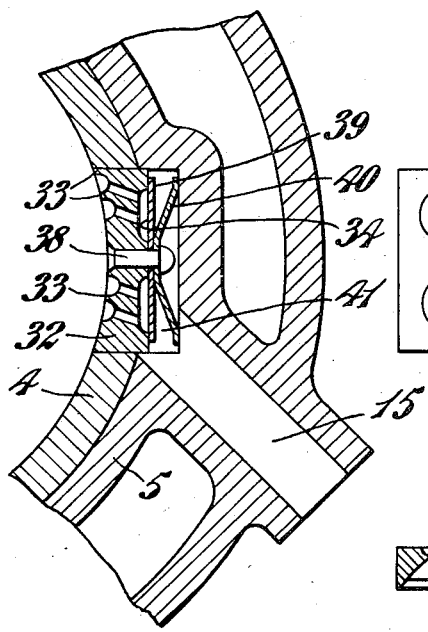
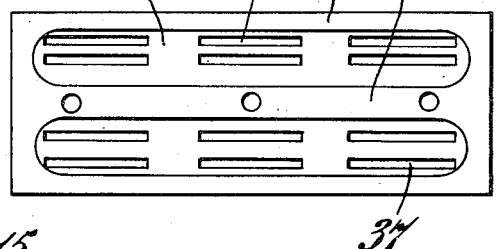
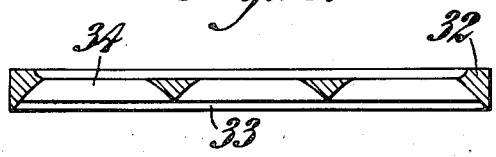
INVENTOR
ROLAND C. CROSS,
BY Carroll Bailey
ATTORNEY Patented Apr. 28, 1936

2,038,830

UNITED STATES PATENT OFFICE 2,038,830

ROTARY VALVE FOR INTERNAL COMBUSTION ENGINES AND THE LIKE

Roland Claude Cross, Odd Down, Bath, England

Application March 28, 1935, Serial No. 13,530
In Great Britain April 20, 1934

5 Claims. (Cl. 123—190)

This invention concerns rotary valves for internal combustion engines and the like, and has for its object to supply to the cylindrical bearing surface of the valve an adequate supply of lubricant not only for the purpose of lubricating the valve effectively, but in sufficient quantities to have also a very definite cooling effect upon the valve and its housing, and also for the purpose of making good fluid contact at all points between the valve surface and the valve housing, particularly for the purpose of improving the heat flow from the valve to its housing.

In the system according to the invention, lubrication and cooling of such rotary valves together with economy in oil consumption, is effected by distributing a copious quantity of lubricant in excess of that normally required for lubrication over the bearing surface of the valve and controlling the amount of lubricant distributed over the said entire bearing surface by a scraping action applied at a predetermined point or points in the travel or path of the valve.

The lubrication of rotary valves has hitherto necessarily been carried out with the minimum quantity of lubricant sufficient to prevent seizure as well as provide lubrication, i. e. by using the well understood border line degree of lubrication, so as to minimize the escape of oil through the port or ports controlled by the valve. In internal combustion engines not only is such an escape a wastage of lubricant, but the efficiency of the engine is impaired when lubricant combines with the fuel mixture.

For these reasons flood lubrication of rotary valves by means of a copious quantity of oil greatly in excess of "border line" lubrication, e. g. ten or twenty times this usual amount, for the purpose of cooling as well as lubricating has not hitherto been practicable, but according to the system of the invention such flood lubrication without the disadvantage of oil wastage and in the case of internal combustion engines resulting inefficiency of the engine, is made possible by controlling the amount of oil distributed over the whole bearing surface of the valve so that well over 90 per cent. of the oil can be removed before it is carried to the port or ports controlled by the valve.

In the preferred system according to the invention, for lubricating and cooling rotary valves of internal combustion engines and the like, such a copious quantity of oil as above referred to is fed to the bearing surface of the valve, and in being distributed as a film thereover is carried round by the valve to a point anterior to a port in the valve housing where surplus oil is removed by a scraping action into a duct associated with a device for effecting the scraping action.

As specifically applied to internal combustion engines wherein the valve controls a cylinder port communicating with the cylinder, the system according to the invention provides for feeding the copious quantity of oil to a point on that side of the said cylinder port where the movement of the valve will carry the oil away from the said port, distributing the oil by the valve rotation as a film over the said bearing surface and removing surplus oil by the scraping action at a point on the opposite side of the said cylinder port.

It has been found in practice that the scraper duct is constantly subjected to wide fluctuations of pressure and particularly is this the case in internal combustion engines wherein the fluctuations are due to the exhaust and inlet ports in the valve continually passing the duct, the pressure variation being as much as from 30 to 50 pounds per square inch when the engine is working at full power to a very low negative pressure which may be 25" of mercury vacuum when the engine is running fast but the throttle is almost shut.

According to another feature of the invention the oil accumulated in the scraper duct is retained therein against varying negative pressures applied thereto during the movement of the valve, by a non-return action preventing withdrawal of oil back into the valve.

Such a non-return action may be produced by a non-return valve in the scraper duct operable by the pressure of oil scraped off the valve surface to permit of the flow of oil to the duct and adapted to close automatically upon the oil pressure being removed.

In its preferred embodiment, the invention provides a circulatory system wherein the scraper duct is connected to an oil supply, and the oil is fed to the valve and returned to the supply from the scraper duct under pressure. Such pressure as is employed for returning the oil from the scraper duct to the supply may be provided simply by the non-return action for preventing oil going back to the valve, or an auxiliary pressure means may be used in addition to the non-return valve above referred to.

Pressure for returning the oil to the supply from the scraper duct when the supply is a separate tank as is used on aircraft engines and motor cycles, may be obtained by connecting the supply tank to the induction pipe of the engine, but preferably circulation of the oil is effected by the action of a double pump of which one part forces oil on to the valve face and the other part withdraws oil from the scraper duct and returns it to the supply.

Alternatively, oil may be withdrawn from the scraper duct and returned to the supply under pressure created by the action of the scraping device operating on the valve.

A rotary valve employing the system according to the invention may comprise a valve housing including a supply duct or ducts for feeding the copious quantity of oil in excess of that normally required for lubrication to the bearing surface of the valve in combination with a duct associated with a scraper extending substantially longitudinally of the valve and resiliently engaging the said bearing surface, said scraper duct being circumferentially spaced from the supply duct or ducts at a point adjacent to a port in the valve housing whereby prior to the copiously lubricated surface reaching said port, the surplus oil is scraped off the said surface in to the scraper duct.

It has been found that centrifugal force tends to prevent the oil from running down into the port holes which are usually incorporated in the wall of the rotary valve, and it is found that the valve will carry the oil very rapidly from the oil inlet side of the valve housing to the scraper side of the valve housing by its own rotational effort.

Preferably, the oil is fed through a groove or line of feed points formed in the housing and disposed substantially longitudinally of the valve, and the said housing may include return passages connecting the scraper duct to an oil supply whereby a continuous circulation of oil may be effected. To this end there is preferably provided in combination with the rotary valve aforesaid, means for applying a copious quantity of oil under pressure to the supply ducts or duct so as to force the oil on to the bearing surface of the valve and provide flood lubrication thereof, and means for withdrawing surplus oil from the scraper duct and returning it to the supply.

These and other features of the present invention will be more clearly understood with reference to the accompanying drawings which illustrate by way of example only applications of the invention to a rotary valve for internal combustion engines.

In the drawings:—

Figure 11:
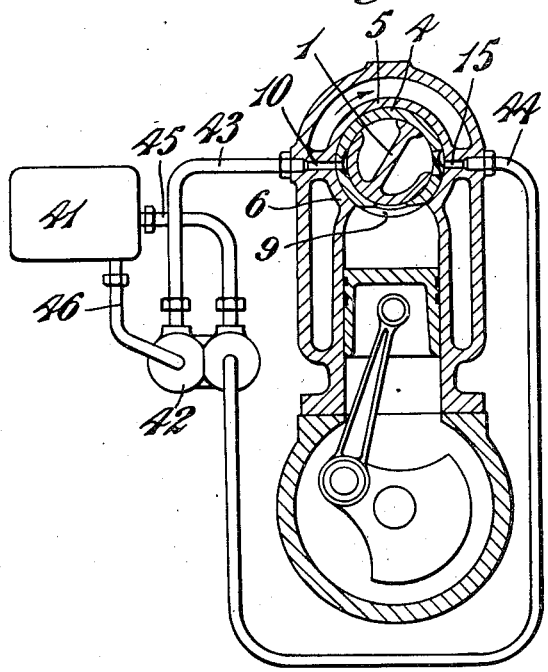
Figure 4:
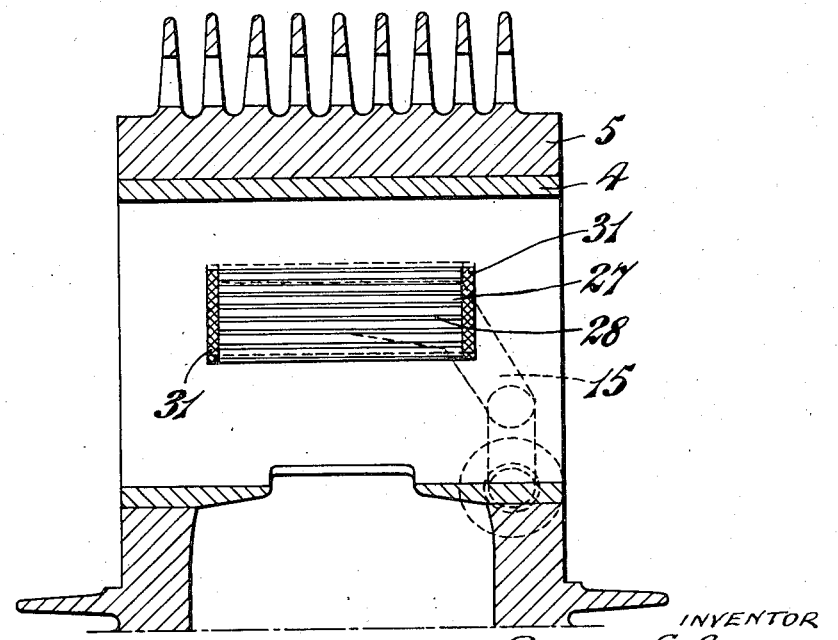
Figure 4 is a longitudinal section through the housing on the line IV—IV of Figure 3.

Figures 5, 6, and 7 are enlarged details of the scraper shown in Figure 4, Figure 5 being a vertical section, Figure 6 a face view of the scraper and Figure 7 a longitudinal section on the line VII—VII of Figure 6;

Figures 8, 9, and 10 show a form of scraper similar to that illustrated in Figures 5, 6, and 7, but modified to incorporate a non-return valve preventing oil being drawn back into the valve or its housing from the scraper duct, a part of the housing together with the scraper in the scraper duct being shown in Figure 8, and the valve plate and spring being removed in Figure 9; and Figure 11 shows in diagram one arrangement for pumping oil on the valve face and withdrawing the surplus oil from the scraper duct.

In the drawings like reference numerals denote like or similar parts in the several views.

Figure 1:
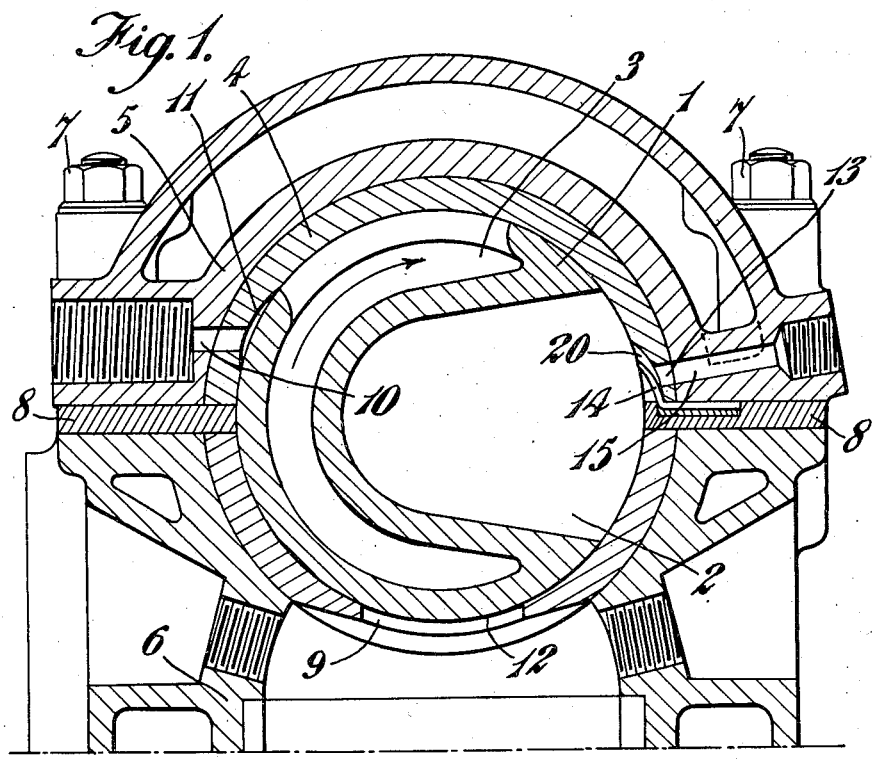
Figure 1 is a vertical section through one form of rotary valve according to the invention as particularly adapted for an internal combustion engine.
Figure 1A:
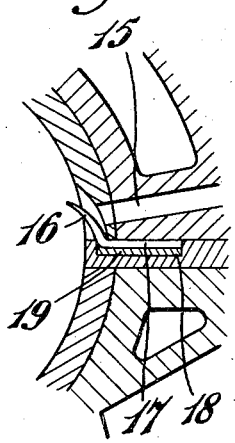
Figure 1A is a detail of Figure 1 showing the scraper and the associated duct into which surplus oil is scraped from the surface of the valve.

With reference first to Figure 1, the valve 1 having the usual inlet and outlet ports 2 and 3, rotates in a liner 4 fixed to and forming part of the valve housing 5 fixed to the cylinder head 6, the housing being constructed in two parts which are held together by bolts 7 with metal packing 8 inserted between the parts.

In the housing 5 is formed the usual port 9 which communicates with the cylinder, and on the left hand side of the port—the rotation of the valve being clockwise as seen from Figure 1— there is formed in the upper part of the housing, a line of supply ducts or feed holes 10 disposed substantially longitudinally of the valve, the housing being grooved longitudinally at 11 in line with the feed holes to facilitate the distribution of the oil over the bearing surface 12 of the valve as the copious quantity of oil is fed through the duct 10.

On the opposite side of the cylinder port 9 and circumferentially spaced from the supply ducts 10, there is formed in the housing the scraper duct 13 housing a scraper 14 extending substantially lengthwise of the valve and resiliently engaging the bearing surface 12.

The line of supply ducts and the scraper duct are disposed as close as practical to the cylinder port 9 so that the bearing area between the ducts, i. e. the top area on to which the valve is forced by the engine explosion, is as large as possible to ensure that such area where the bearing pressure is highest is effectually flooded with oil, and preferably the bearing area between the ducts subtends at the valve axis, as shown, an angle approaching 180 degrees, and for all practical purposes it is preferable that the angle should be equal to or greater than 90 degrees.

Connecting the scraper duct 13 with an oil supply (not shown in Figure 1) are return passages 15, and according to the system of the invention, the copious quantity of oil will be pumped on to the bearing surface 12 through the supply ducts 10 and, where provided, through the distributing groove or grooves 11, and the valve in rotating will carry the oil with it and at the same time distribute the oil over its surface as a relatively homogeneous film providing good fluid contact and a definite cooling effect upon the valve and its housing.

When the bearing surface reaches the scraper 14, the major portion of the oil is scraped off the bearing surface into the scraper duct 13, wherein it accumulates and is returned via passage 15 to the source of supply, and only the minimum quantity of oil remains to be carried past the cylinder port 9 but sufficient to provide adequate lubrication over the area between the scraper duct and the port, each side of the port longitudinally, and between the port and the supply ducts 10.

One way of pumping the lubricant on to the bearing surface 12 and returning the oil from the scraper duct to the supply is shown in Figure 11. Referring to the diagram, Figure 11, the part designated 41 is a supply tank, and 42 is a double pump. The pump 42 supplies oil to the feed passage 10 through the pipe 43 and receives the scraped off oil from the passage 15 through the pipe 44. The surplus oil is then returned to the tank 41 through the pipe 45 and commences recirculating via the pipe 46.

Various forms of scraping device may be employed, and several preferred constructions are shown in the drawings.

In Figure 1 the scraper consists of a resilient blade of springy metal made from a flat plate which is bent into the shape of an L viewed endwise, of which the short arm 16 constitutes the blade and is preferably curved as shown so that the outer edge—which is the scraping edge—attacks the valve with a good resilient contact, and the longer arm 17 is clamped in a longitudinal recess 18 in the metal packing 8 separating the upper and lower parts of the valve housing, resilient packing 19 being inserted between the arm 17 and the packing 8 to prevent oil leakage into the valve and from the housing.

The blade 16 is housed in the scraper duct 13 which comprises a longitudinal chamber the walls of which are spaced from the blade so as to provide recesses 20 at the rear of the blade into which recesses the surplus oil is scraped and accumulates to form a head of oil which may of itself be sufficient to force the oil back to the supply, and in any case will facilitate the action of the pumping means when such is employed.

Figure 2:
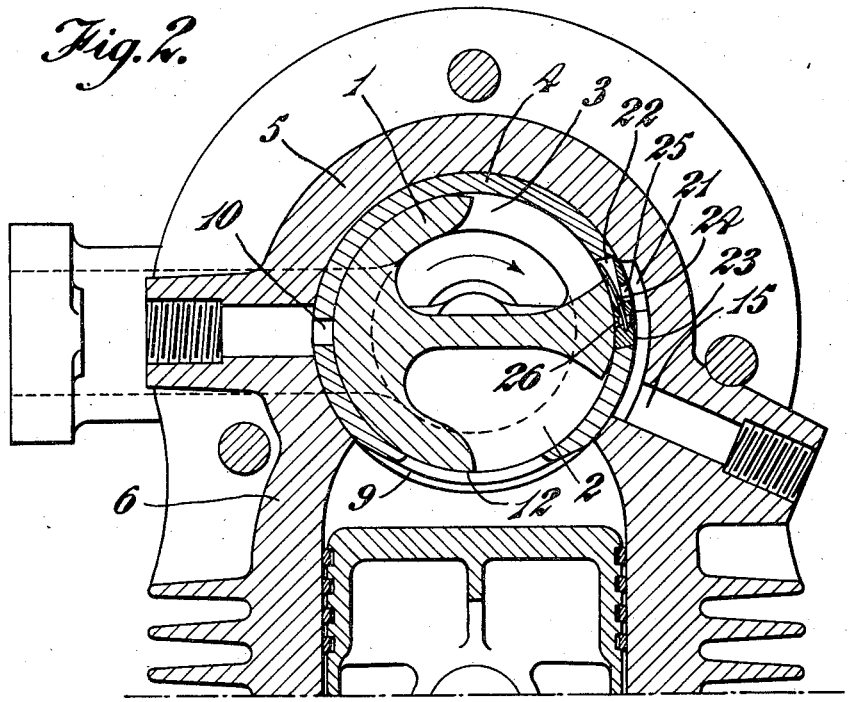
Figure 2 shows an alternative form of rotary valve according to the invention, employing a modified oil feed and scraper.

An alternative form of resilient scraper blade is shown in Figure 2 wherein a different construction of housing is used which does not include the oil distribution grooves 11 although such may be provided if necessary or desirable. In the construction the scraper duct is constituted by a shallow rectangular recess 21 cut in and running the length of the main part of the housing and communicating with a slot 22 in the liner 4 in which is fitted a mounting plate 23 carrying the scraper blade 24, the plate having a port or ports 25 giving the oil access to the recess 21 and from thence to the return passages 15. The scraper blade 24 consists of a flat strip of springy metal one side of which fits into a groove in the mounting plate and is held therein by rivets 26, while the other side is formed as a free springy lip which is slightly curved so as to make good resilient contact with the bearing surface 12. In this construction also it will be noted that as the oil is scraped off the bearing surface, a pressure head will under most conditions be created for forcing the oil back to the supply.

A further construction of resilient scraper blade which is not shown, but which will be readily understood from the preceding figures, may consist of a U-shaped strip of springy metal of which one edge of the U is adapted to scrape on the bearing surface of the valve while the other edge remains stationary against the back edge of a slot such as the slot 22 which is cut in the liner or bush to accommodate the U strip, the latter being perforated to allow the oil gaining access to the shallow recess 21 forming part of the scraper duct.

In Figures 3-10 are shown preferred constructions of rigid scraper and the manner of mounting the same in the scraper duct so as to resiliently engage the bearing surface.

Figure 3:
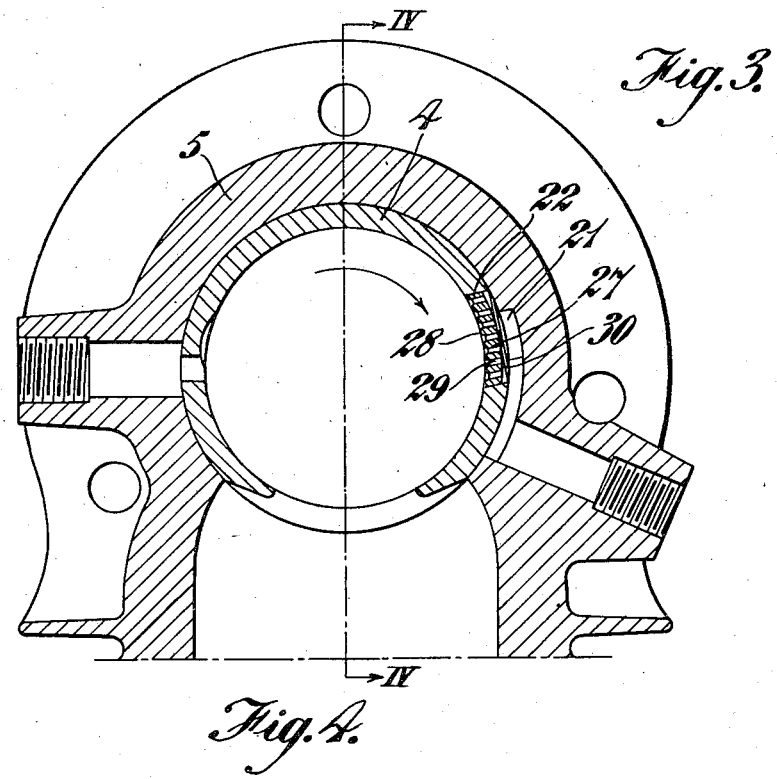
Figure 3 is a vertical section through the valve housing modified to receive a rigid form of spring-pressed scraper.

The valve housing 5 in Figures 3 and 4 has a scraper duct similarly constituted to that of Figure 2, and the scraper comprises a rigid metal plate 27 grooved longitudinally to form a series of tongues 28 and provided with communicating passages consisting of slots 29 connecting the grooves with the rear of the scraper plate. The scraper plate 27 fits the slot 22 in the liner 4 and behind the plate is mounted a spring 30 which presses the scraper tongues 28 into resilient engagement with the bearing surface of the valve.

By employing such a scraper, the bearing surface of the valve is successively scraped by the individual tongues in turn as the valve rotates with the result that a uniform and efficient scraping action is effected ensuring that the maximum amount of surplus oil is scraped off the copiously lubricated surface and wastage is reduced to a minimum commensurate with sufficient lubrication during the passage of the valve from the scraper duct to the supply where a further copious quantity of oil will be fed thereto.

In order to prevent oil leaking past the scraper into the valve, resilient packing 31—see Figure 4 only—may be inserted between the ends of the scraper and the walls of the recess 22.

A similar form of scraper to that just described is shown in Figures 8–10, wherein the scraper is modified to include a non-return valve preventing oil being drawn back from the scraper duct into the valve. The scraper comprises a rigid metal plate 32 which is grooved along the front face to provide a series of scraper tongues 33 and is provided with two parallel longitudinal recesses 34 in the rear face, one on either side of a partition wall 36, the grooves and the recesses being connected by communicating passages in the form of slots 37.

Fixed centrally to the partition wall 36, by means of rivets or the like 38, is a springy valve plate 39 covering the recesses 34 and a spring 40 bent away from the valve plate to form a spring abutment which engages with the rear of the scraper duct.

When employing this construction of scraper, the scraper duct will consist of a rectangular chamber 41 extending lengthwise of the valve, into which chamber the scraper 32 is fitted with the spring plate 40 abutting the rear of the chamber as shown so as to press the scraper tongues 33 into resilient engagement with the bearing surface of the valve. As the oil is scraped from off the bearing surface, the resilient valve plate will lift at the edges—which are free—and allow the oil to pass to the rear of the scraper duct and from thence through the return passages 15 to the supply. Immediately the oil pressure created by the scraping action is withdrawn i. e. when the bearing surface has passed the scraper duct, the valve plate will recover under its own springiness and close the recesses 34 so that the oil cannot be drawn back into the valve by varying negative pressures which may be applied to the scraper duct as the ports of the valve pass thereby, the action of any suction pressure to the scraper being to effect a tighter closure of the recesses by the valve plate. This oil expelling process, however, is accentuated greatly by exhaust gas pressure as the exhaust port in the valve passes the scraper. If desirable resilient packing at the ends or sides of the scraper may also be incorporated in this construction.

By employing the system and apparatus according to the invention not only is lubrication considerably more copious e. g. ten or twenty times greater than is usually practical, but by reason of the increased quantity of oil the valve temperature is reduced by actual oil cooling and a far better conducting film of oil is produced which carries the heat from the valve to the housing therefor, and moreover by reason of the scraping action being applied anterior to the port or ports controlled by the valve the major portion of the oil is recovered so that economy in consumption is effected.

The scraper could extend longer than the length of the valve; in fact, on multi-cylinder in line valve arrangements the several scrapers could with advantage be combined as a single unit running continuously the whole length of the cylinder head.

I claim:

1. In combination, a casing having a valve chamber, a rotary valve therein, means for delivering oil to the exterior surface of said valve, said casing having a recess opening into said valve chamber, a resilient scraper blade disposed within said recess and having a free edge yieldably engaging the valve, the free edge of said blade being spaced from the adjacent wall of the recess to permit oil scraped from the valve by the blade to flow into the recess space behind said blade, and means for conducting scraped oil from said recess.

2. In combination, a casing having a valve chamber, a rotary valve therein, means for delivering oil to the exterior surface of said valve, said casing having a recess opening into said valve chamber, a scraper element disposed within said recess and urged yieldably against said valve, said scraper element having openings extending therethrough for flow of oil from the valve through said scraper element into the recess space behind the scraper element, and means for conducting scraped oil from said recess.

3. In combination, a casing having a valve chamber, a rotary valve therein, means for delivering oil to the exterior surface of said valve, said casing having a recess opening into said valve chamber, a scraper element disposed within said recess, spring means within said recess behind said scraper element urging the latter against the valve, said scraper element having openings extending therethrough for flow of oil from the valve through said scraper element into the recess space behind the scraper element, and a flap valve carried by said scraper element at the rear thereof for cooperation with said scraper element to maintain the flow of oil unidirectional away from the valve.

4. In combination, a casing having a valve chamber, a rotary valve therein, means for delivering oil to the exterior surface of said valve, said casing having a recess opening into said valve chamber, a scraper element disposed within said recess, spring means within said recess behind said scraper element urging the latter against the valve, the valve engaging face of said scraper element being ribbed, said scraper element having openings formed therethrough between the ribs thereof for flow of oil through the scraper element into the recess space behind the scraper element, and means for conducting oil from said recess.

5. The combination as set forth in claim 4 including a flap valve carried by the scraper element at the rear thereof to prevent return flow of oil through the scraper element to the valve from the recess space behind the scraper element.

ROLAND CLAUDE CROSS.